United States Patent
Cooley et al.

(10) Patent No.: US 11,940,770 B2
(45) Date of Patent: *Mar. 26, 2024

(54) AUTOMATED DATA INTEGRATION PIPELINE WITH STORAGE AND ENRICHMENT

(71) Applicant: Mapped Inc., El Segundo, CA (US)

(72) Inventors: Shaun Cooley, El Segundo, CA (US); Jose De Castro, San Francisco, CA (US); Jason Koh, San Diego, CA (US)

(73) Assignee: MAPPED INC., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/372,247

(22) Filed: Jul. 9, 2021

(65) Prior Publication Data
US 2022/0147000 A1     May 12, 2022

Related U.S. Application Data

(60) Provisional application No. 63/112,268, filed on Nov. 11, 2020.

(51) Int. Cl.
*G06F 16/25* (2019.01)
*G05B 19/05* (2006.01)
(Continued)

(52) U.S. Cl.
CPC .......... *G05B 19/054* (2013.01); *G05B 19/05* (2013.01); *G06F 9/54* (2013.01); *G06F 16/212* (2019.01);
(Continued)

(58) Field of Classification Search
CPC .......... G05B 19/042; G05B 19/05; G05B 2219/2642; G06F 5/00; G06F 12/00; G06F 16/254
See application file for complete search history.

(56) References Cited

U.S. PATENT DOCUMENTS

| | | |
|---|---|---|
| 5,663,891 A | 9/1997 | Bamji et al. |
| 5,729,466 A | 3/1998 | Bamji |

(Continued)

FOREIGN PATENT DOCUMENTS

| | | |
|---|---|---|
| WO | WO-9913418 A1 | 3/1999 |
| WO | WO-2020089259 A1 | 5/2020 |

(Continued)

OTHER PUBLICATIONS

Cheong. Four ways to quantify synchrony between time series data. Towards Data Science Available athttps://towardsdatascience.com/four-ways-to-quantify-synchrony-between-time-series-data-b99136c4a9c9 (May 13, 2019).

(Continued)

*Primary Examiner* — Mark D Featherstone
*Assistant Examiner* — Navneet Gmahl
(74) *Attorney, Agent, or Firm* — WILSON SONSINI GOODRICH & ROSATI

(57) ABSTRACT

Described are platforms, systems, and methods to automatically discover, extract, map, merge, and enrich data found in on-premises in automated industrial and commercial environments and cloud systems for purposes of providing developers access to normalized, merged, and enriched data through an API. The platforms, systems, and methods identify a plurality of data sources associated with an automation environment; retrieve data from at least one of the identified data sources; apply a first algorithm to map the retrieved data to a predetermined ontology; merge the mapped data into a data store comprising timeseries of the mapped data; apply a second algorithm to identify patterns in the merged data and enriching the data based on one or more identified patterns; and provide one or more APIs or one or more real-time streams to provide access to the enriched data.

18 Claims, 5 Drawing Sheets

(51) Int. Cl.

| | |
|---|---|
| *G06F 9/54* | (2006.01) |
| *G06F 16/21* | (2019.01) |
| *G06F 16/901* | (2019.01) |
| *G06F 18/21* | (2023.01) |
| *G06F 18/2415* | (2023.01) |
| *G06N 20/00* | (2019.01) |
| *H04L 41/12* | (2022.01) |

(52) U.S. Cl.
CPC ........ *G06F 16/254* (2019.01); *G06F 16/9024* (2019.01); *G06F 18/2178* (2023.01); *G06F 18/24155* (2023.01); *G06N 20/00* (2019.01); *H04L 41/12* (2013.01); *G05B 2219/1215* (2013.01); *G05B 2219/13129* (2013.01); *G05B 2219/15012* (2013.01); *G05B 2219/163* (2013.01)

(56) References Cited

U.S. PATENT DOCUMENTS

| | | | |
|---|---|---|---|
| 7,606,890 | B1 | 10/2009 | Baier et al. |
| 8,773,437 | B1 | 7/2014 | Goldman et al. |
| 8,819,206 | B2 | 8/2014 | Bandi et al. |
| 9,667,641 | B2* | 5/2017 | Muddu .................. H04L 63/06 |
| 10,019,536 | B2 | 7/2018 | Hong et al. |
| 10,044,630 | B2* | 8/2018 | Kriegesmann .......... H04L 47/70 |
| 10,216,706 | B1 | 2/2019 | Bonk et al. |
| 10,353,596 | B2 | 7/2019 | Zhou |
| 10,540,383 | B2 | 1/2020 | Cobbett et al. |
| 10,699,214 | B2 | 6/2020 | Chen et al. |
| 10,901,373 | B2* | 1/2021 | Locke .................. G06T 19/006 |
| 10,929,777 | B2 | 2/2021 | Adjaoute |
| 10,997,195 | B1* | 5/2021 | Sekar .................... G06N 20/00 |
| 11,272,011 | B1 | 3/2022 | Laughton et al. |
| 11,455,287 | B1 | 9/2022 | Hillion et al. |
| 11,526,261 | B1* | 12/2022 | Leach .................. G06F 3/0484 |
| 11,636,234 | B2 | 4/2023 | Rejeb Sfar et al. |
| 2003/0212678 | A1 | 11/2003 | Bloom et al. |
| 2004/0049699 | A1 | 3/2004 | Griffith et al. |
| 2004/0210654 | A1 | 10/2004 | Hrastar |
| 2004/0260518 | A1 | 12/2004 | Polz et al. |
| 2007/0208440 | A1 | 9/2007 | Bliss et al. |
| 2008/0189402 | A1 | 8/2008 | Betzler et al. |
| 2009/0100407 | A1* | 4/2009 | Bouillet .................... G06F 8/34 717/105 |
| 2010/0014432 | A1 | 1/2010 | Durfee et al. |
| 2010/0257535 | A1 | 10/2010 | Badovinatz et al. |
| 2011/0004631 | A1 | 1/2011 | Inokuchi et al. |
| 2011/0087522 | A1 | 4/2011 | Beaty et al. |
| 2011/0179027 | A1 | 7/2011 | Das et al. |
| 2011/0295903 | A1 | 12/2011 | Chen |
| 2012/0084422 | A1 | 4/2012 | Bandi et al. |
| 2012/0158745 | A1 | 6/2012 | Gorelik et al. |
| 2012/0158933 | A1 | 6/2012 | Shetty et al. |
| 2012/0259466 | A1 | 10/2012 | Ray et al. |
| 2012/0321174 | A1 | 12/2012 | Tsymbal et al. |
| 2013/0124465 | A1 | 5/2013 | Pingel et al. |
| 2013/0232123 | A1 | 9/2013 | Ahmed et al. |
| 2014/0122806 | A1 | 5/2014 | Lin et al. |
| 2014/0277604 | A1* | 9/2014 | Nixon ................ G05B 19/4185 700/47 |
| 2015/0074078 | A1 | 3/2015 | Roche et al. |
| 2015/0074117 | A1 | 3/2015 | Gorelik et al. |
| 2015/0095770 | A1 | 4/2015 | Mani et al. |
| 2015/0180891 | A1 | 6/2015 | Seward et al. |
| 2015/0256635 | A1 | 9/2015 | Casey et al. |
| 2015/0281105 | A1 | 10/2015 | Vaderna et al. |
| 2016/0019228 | A1 | 1/2016 | Hong et al. |
| 2016/0098037 | A1* | 4/2016 | Zornio ................ H04L 41/0803 700/20 |
| 2016/0132538 | A1* | 5/2016 | Bliss ........................ G06F 16/20 707/741 |
| 2016/0342707 | A1* | 11/2016 | Drobek ............... G06F 16/9024 |
| 2016/0373481 | A1 | 12/2016 | Sultan et al. |
| 2017/0085438 | A1 | 3/2017 | Link et al. |
| 2017/0154080 | A1* | 6/2017 | De Smet ........... G06F 16/24568 |
| 2017/0154282 | A1* | 6/2017 | Rossi ..................... G06V 10/94 |
| 2017/0168779 | A1* | 6/2017 | Sevenich ............... G06F 8/456 |
| 2017/0249434 | A1* | 8/2017 | Brunner ............. G06F 16/3334 |
| 2017/0279687 | A1 | 9/2017 | Muntés-Mulero et al. |
| 2017/0286456 | A1 | 10/2017 | Wenzel et al. |
| 2018/0173795 | A1* | 6/2018 | Cobbett ................ G06F 16/316 |
| 2018/0219888 | A1* | 8/2018 | Apostolopoulos .......................... G06F 16/9024 |
| 2018/0219919 | A1* | 8/2018 | Crabtree ............... G06F 16/951 |
| 2018/0232459 | A1* | 8/2018 | Park ...................... G05B 15/02 |
| 2019/0057064 | A1 | 2/2019 | Bonk et al. |
| 2019/0108197 | A1 | 4/2019 | Bonk et al. |
| 2019/0132145 | A1 | 5/2019 | O'Hora |
| 2019/0133026 | A1* | 5/2019 | Seaman ............... A01B 79/005 |
| 2019/0158353 | A1 | 5/2019 | Johnson et al. |
| 2019/0187643 | A1 | 6/2019 | Carpenter et al. |
| 2019/0205148 | A1* | 7/2019 | Schur .................... G06F 3/0482 |
| 2019/0220583 | A1* | 7/2019 | Douglas ................ G06F 21/316 |
| 2019/0324831 | A1* | 10/2019 | Gu ........................ G06F 11/0775 |
| 2019/0384238 | A1 | 12/2019 | Songkakul |
| 2020/0004751 | A1* | 1/2020 | Stennett ................. G06N 20/00 |
| 2020/0280565 | A1 | 9/2020 | Rogynskyy et al. |
| 2020/0296137 | A1* | 9/2020 | Crabtree ............. H04L 63/1425 |
| 2020/0301972 | A1* | 9/2020 | Wang ..................... G06N 20/10 |
| 2020/0313924 | A1* | 10/2020 | Park ...................... H04L 12/2809 |
| 2020/0327371 | A1* | 10/2020 | Sharma ...................... G06N 3/08 |
| 2020/0327444 | A1 | 10/2020 | Negi et al. |
| 2020/0379992 | A1* | 12/2020 | De Smet ................. G06F 16/28 |
| 2020/0394455 | A1* | 12/2020 | Lee ....................... G06Q 40/08 |
| 2021/0073216 | A1* | 3/2021 | Chang .................. G06F 16/248 |
| 2021/0090694 | A1* | 3/2021 | Colley .................... G16H 50/70 |
| 2021/0097446 | A1 | 4/2021 | Kim et al. |
| 2021/0133670 | A1 | 5/2021 | Cella et al. |
| 2021/0157312 | A1 | 5/2021 | Cella et al. |
| 2021/0157671 | A1* | 5/2021 | Shastri ..................... H04L 41/12 |
| 2021/0273965 | A1* | 9/2021 | Pi ........................... G06F 21/566 |
| 2021/0287459 | A1* | 9/2021 | Cella ..................... G07C 5/0808 |
| 2021/0293103 | A1 | 9/2021 | Olsen et al. |
| 2021/0333762 | A1 | 10/2021 | Govindaraj et al. |
| 2022/0138557 | A1* | 5/2022 | Rossi .................. G06F 16/9024 706/21 |
| 2022/0147008 | A1 | 5/2022 | Cooley et al. |
| 2022/0156433 | A1 | 5/2022 | Laane et al. |
| 2022/0214170 | A1 | 7/2022 | Singh et al. |
| 2023/0004548 | A1* | 1/2023 | Papakonstantinou ......................... G06F 16/254 |
| 2023/0359830 | A1 | 11/2023 | Koh |

FOREIGN PATENT DOCUMENTS

| | | |
|---|---|---|
| WO | WO-2022059588 A1 | 3/2022 |
| WO | WO-2022103812 A1 | 5/2022 |
| WO | WO-2022103813 A1 | 5/2022 |
| WO | WO-2022103820 A1 | 5/2022 |
| WO | WO-2022103822 A1 | 5/2022 |
| WO | WO-2022103824 A1 | 5/2022 |
| WO | WO-2022103829 A1 | 5/2022 |
| WO | WO-2022103831 A1 | 5/2022 |
| WO | WO-2023215892 A1 | 11/2023 |

OTHER PUBLICATIONS

Co-pending U.S. Appl. No. 17/372,238, inventors Cooley; Shaun et al., filed Jul. 9, 2021.

Co-pending U.S. Appl. No. 17/372,242, inventors Cooley; Shaun et al., filed Jul. 9, 2021.

Co-pending U.S. Appl. No. 17/372,251, inventors Cooley; Shaun et al., filed Jul. 9, 2021.

Co-pending U.S. Appl. No. 17/372,256, inventors Cooley; Shaun et al., filed Jul. 9, 2021.

Co-pending U.S. Appl. No. 17/372,267, inventors Cooley; Shaun et al., filed Jul. 9, 2021.

Co-pending U.S. Appl. No. 17/372,275, inventors Cooley; Shaun et al., filed Jul. 9, 2021.

(56) References Cited

OTHER PUBLICATIONS

Grady et al. Robust classification of salient links in complex networks. Nat Commun 3:864 (May 29, 2012).
George et al. Big data and management. Academy of management Journal 57(2):321-326 (2014). Retrieved on Jan. 8, 2022 from https://journals.aom.org/doi/abs/10.5465/amj.2014.4002?journalCode=amj.
PCT/US2021/058748 International Search Report and Written Opinion dated Feb. 9, 2022.
PCT/US2021/058749 International Search Report and Written Opinion dated Dec. 22, 2021.
PCT/US2021/058756 International Search Report and Written Opinion dated Jan. 11, 2022.
PCT/US2021/058759 International Search Report and Written Opinion dated Dec. 22, 2021.
PCT/US2021/058762 International Search Report and Written Opinion dated Dec. 23, 2021.
PCT/US2021/058768 International Search Report and Written Opinion dated Jan. 24, 2022.
PCT/US2021/058771 International Search Report and Written Opinion dated Jan. 11, 2022.
U.S. Appl. No. 17/372,238 Non-Final Office Action dated Jan. 19, 2022.
U.S. Appl. No. 17/372,242 Final Office Action dated Mar. 4, 2022.
U.S. Appl. No. 17/372,251 Final Office Action dated Feb. 22, 2022.
U.S. Appl. No. 17/372,256 Final Office Action dated Feb. 18, 2022.
U.S. Appl. No. 17/372,267 Final Office Action dated Feb. 9, 2022.
U.S. Appl. No. 17/372,275 Final Office Action dated Mar. 4, 2022.
U.S. Appl. No. 17/372,251 Office Action dated Nov. 5, 2021.
U.S. Appl. No. 17/372,267 Office Action dated Oct. 26, 2021.
U.S. Appl. No. 17/372,242 Office Action dated Nov. 15, 2021.
U.S. Appl. No. 17/372,256 Office Action dated Oct. 29, 2021.
U.S. Appl. No. 17/372,275 Office Action dated Nov. 10, 2021.
U.S. Appl. No. 17/372,267 Final Office Action dated Oct. 24, 2022.
Kind et al.: Relationship Discovery with NetFlow to Enable Business-Driven IT Management. IEEE Xplore, Conference: Business-Driven IT Management, 2006, pp. 63-70 DOI:10.1109/BDIM.2006. 1649212 (2006).
U.S. Appl. No. 17/372,238 Final Office Action dated Apr. 19, 2022.
U.S. Appl. No. 17/372,267 Non-Final Office Action dated Jul. 21, 2022.
Co-pending U.S. Appl. No. 18/144,101, inventor Koh; Jason, filed May 5, 2023.
U.S. Appl. No. 17/372,267 Non-Final Office Action dated Mar. 28, 2023.
U.S. Appl. No. 18/144,101 Non-Final Office Action dated Jul. 14, 2023.
Abualdenien et al. Ensemble-learning approach for the classification of Levels of Geometry (LOG) of building elements. Advanced Engineering Informatics 51:101497 (2022).
PCT/US2023/066693 International Search Report and Written Opinion dated Sep. 25, 2023.
Marcisak, Correlating inferred data plane IPv6 reboot events with control plane BGP activity (Doctoral dissertation, Monterey, California: Naval Postgraduate School) (2016).
U.S. Appl. No. 17/372,267 Notice of Allowance dated Dec. 20, 2023.
U.S. Appl. No. 18/144,101 Notice of Allowance dated Oct. 27, 2023.

\* cited by examiner

AUTOMATED DATA INTEGRATION PIPELINE WITH STORAGE AND ENRICHMENT

CROSS-REFERENCE TO RELATED APPLICATIONS

This application is related to U.S. application Ser. Nos. 17/372,238, 17/372,242, 17/372,251, 17/372,256, 17/372,267, and U.S. application Ser. No. 17/372,275, all filed on the same date, Jul. 9, 2021, the same date on which the present application was filed. This application claims the priority and benefit of U.S. Provisional Application No. 63/112,268, filed Nov. 11, 2020, and entitled: DATA INTEGRATION AND ENRICHMENT PLATFORM FOR AUTOMATED INDUSTRIAL AND COMMERCIAL ENVIRONMENTS. All of these applications are incorporated herein by reference in their entireties.

BACKGROUND

Automation is the use of control systems to operate processes without human intervention. These systems generally include software, computers, beacons, sensors, actuators, and in some cases robotics. In industrial and commercial settings, benefits of automation include increases in productivity, accuracy, flexibility, and safety, while providing overall cost savings. A "smart building" uses a combination of technologies to automate building management. The terms "smart office" and "smart home" are used to describe a structure that uses technology to allow systems and electronics to communicate with one another, be controlled by a time schedule, and even be remotely activated from a smartphone or other web-enabled device. A few of the systems that can be controlled include lighting, heating, ventilation, air conditioning, vertical lifts, fire safety systems, appliances, and security systems. As such, smart buildings can provide comfort and convenience while enhancing security and energy efficiency. Cities of the future are anticipated to offer a wide array of "smart technologies," e.g., networked technology that controls aspects of transportation, energy, air, and water quality.

SUMMARY

The current world of data integration is largely split between integration platforms-as-a-service (iPaaS) and homegrown extract, transform, load (ETL or ELT) solutions. Existing systems require manual configuration of data sources, manual mapping of fields or columns from source to destination, and result in the data being either streaming through a pipeline like a firehose or locked in a database or data lake for use at some point in the future. Worse yet, the manual mapping of fields from source to destination means that the output data format is likely in a bespoke format that is not useful beyond the creator's target.

The existing iPaaS and ETL/ELT solutions work for many use cases, which is why they are so popular, but fall far short for industrial and commercial automation systems. These automation systems often have tens of thousands of devices producing data, spread across millions of square feet, and using a multitude of protocols. To make matters worse, a single company is unlikely to have the same system configuration across multiple environments—that is, no two buildings or two manufacturing plants are alike. This extreme heterogeneity means that the current solutions require months to configure for a single environment, which can make an enterprise-wide deployment an impossible task.

Described herein are platforms, systems, and methods that automatically discover, extract, map, merge, and enrich data found in systems on-premises in automated industrial and commercial environments and cloud systems for purposes of providing developers access to normalized, merged, and enriched data through an API.

The subject matter described herein includes platforms, systems, and methods that significantly improve upon current iPaaS and ETL/ELT systems by improving the speed, responsiveness, and performance of, and automating all aspects of: data source discovery, data extraction, mapping of input data to a well-defined ontology, merging the mapped data into a combination graph and timeseries database, enriching the data, and making the resulting normalized, merged, and enriched data available to developers through both APIs and real-time streams. The following components, in various embodiments, are needed to implement the platforms, systems, and methods described herein:

Data or data source discovery mechanism;
Data extraction system;
Data mapping mechanism;
Data storage system; and
Data merging method.

Accordingly, in one aspect, disclosed herein are computer-implemented methods comprising: identifying a plurality of data sources associated with an automation environment; retrieving data from at least one of the identified data sources; applying a first algorithm to map the retrieved data to a predetermined ontology; merging the mapped data into a data store comprising timeseries of the mapped data; applying a second algorithm to identify patterns in the merged data and enriching the data based on one or more identified patterns; and providing one or more APIs or one or more real-time streams to provide access to the enriched data. In some embodiments, the automation environment comprises at least one networked industrial or commercial automation system. In various embodiments, the plurality of data sources comprises at least one device, at least one programmable logic controller (PLC), at least one automation controller, at least one data file, at least one cloud service, or a combination thereof. In some embodiments, the plurality of data sources comprises at least one device utilizing a first communications protocol and at least one device utilizing a second communications protocol, wherein the first communications protocol is different from the second communications protocol. In various embodiments, the plurality of data sources comprises at least 1,000, at least 10,000, or at least 100,000 data sources. In some embodiments, the identifying the plurality of data sources is performed by passive discovery, active discovery, target interrogation, or a combination thereof. In further embodiments, the passive discovery comprises observing traffic on a network. In still further embodiments, the passive discovery comprises identifying an origin or a destination for the traffic on the network. In further embodiments, the active discovery comprises IP subnet scanning on a network, port scanning on a network, issuing protocol specific discovery commands (such as whois commands) on a network, or a combination thereof. In further embodiments, the target interrogation comprises introspecting at least one PLC on a network. In some embodiments, the retrieving data is: performed on a schedule, performed in response to an event, a result of passively observing communications among the data sources, or a combination thereof. In some embodiments, the first algorithm comprises, a logic schema, a set of rules, a machine learning model, a statistical model, or a combination thereof. In some embodiments, the data store comprises a graph database, wherein each vertex in the graph comprises a timeseries store to capture data changes over time. In further embodiments, the merging the mapped data into the data store comprises matching mapped data with evolved vertices in the graph and merging any new properties, shape details, or relationships into the matched vertices and any timeseries data recorded in the vertex's timeseries store. In further embodiments, the vertices, edges, properties, and underlying data is substantially continuously updated to reflect the state of the extracted data. In further embodiments, the enriching the data comprises creating, updating, or deleting vertices in the graph, edges in the graph, vertex properties in the graph, or edge properties in the graph. In further embodiments, the applying the second algorithm to identify patterns in the merged data comprises identifying patterns in the graph, the timeseries, or both the graph and the timeseries. In further embodiments, the enriching the data is performed by a plurality of software agents, each configured to generate a specific enrichment. In some embodiments, the method further comprises contributing enrichments back to the graph database with origin tagging, wherein the origin tagging identifies the software agent that generated the enrichment. In some embodiments, the second algorithm comprises a statistical analysis, a machine learning model, or a combination thereof. In some embodiments, the steps are performed by a computer-based platform automatically and substantially continuously.

In another aspect, disclosed herein are platforms and systems comprising at least one computing device comprising at least one processor, a memory, and instructions executable by the at least one processor to create an application comprising: a data source discovery software module configured to identify a plurality of data sources associated with an automation environment; a data extraction software module configured to retrieve data from at least one of the identified data sources; a data mapping software module configured to apply a first algorithm to map the retrieved data to a predetermined ontology; a data storage software module configured to store timeseries of the mapped data in a data store; a data merging software module configured to merge the mapped data into the data store; a data enrichment software module configured to apply a second algorithm to identify patterns in the merged data and enrich the data based on one or more identified patterns; and a data access software module configured to provide one or more APIs or one or more real-time streams comprising the enriched data. In some embodiments, the automation environment comprises at least one networked industrial or commercial automation system. In various embodiments, the plurality of data sources comprises at least one device, at least one PLC, at least one automation controller, at least one data file, at least one cloud service, or a combination thereof. In some embodiments, the plurality of data sources comprises at least one device utilizing a first communications protocol and at least one device utilizing a second communications protocol, wherein the first communications protocol is different from the second communications protocol. In various embodiments, the plurality of data sources comprises at least 1,000, at least 10,000, or at least 100,000 data sources. In some embodiments, the data source discovery software module identifies the plurality of data sources by passive discovery, active discovery, target interrogation, or a combination thereof. In further embodiments, the passive discovery comprises observing traffic on a network. In still further embodiments, the passive discovery comprises identifying an origin or a destination for the traffic on the network. In further embodiments, the active discovery comprises IP subnet scanning on a network, port scanning on a network, issuing protocol specific discovery commands (such as whois commands) on a network, or a combination thereof. In further embodiments, the target interrogation comprises introspecting at least one PLC on a network. In some embodiments, data extraction software module retrieves the data on a schedule, in response to an event, or a combination thereof. In some embodiments, the first algorithm comprises, a logic schema, a set of rules, a machine learning model, a statistical model, or a combination thereof. In some embodiments, the data store comprises a graph database, wherein each vertex in the graph comprises a timeseries store to capture data changes over time. In further embodiments, the data merging software module merges the mapped data into the data store by matching mapped data with evolved vertices in the graph and merging any new properties, shape details, or relationships into the matched vertices and any timeseries data recorded in the vertex's timeseries store. In further embodiments, the vertices, edges, properties, and underlying data is substantially continuously updated to reflect the state of the extracted data. In further embodiments, the data enrichment software module enriches the data creating, updating, or deleting vertices in the graph, edges in the graph, vertex properties in the graph, or edge properties in the graph. In further embodiments, the data enrichment software module applies the second algorithm to identify patterns in the graph, the timeseries, or both the graph and the timeseries. In some embodiments, the application comprises a plurality of data enrichment software modules, each configured to generate a specific enrichment. In further embodiments, the application further comprises a software module configured to contribute enrichments back to the graph database with origin tagging, wherein the origin tagging identifies the data enrichment software module that generated the enrichment. In some embodiments, the second algorithm comprises a statistical analysis, a machine learning model, or a combination thereof. In some embodiments, the software modules perform their configured functions automatically and substantially continuously.

In another aspect, disclosed herein are non-transitory computer-readable storage media and devices encoded with instructions executable by one or more processors to provide an application comprising: a data source discovery module identifying a plurality of data sources associated with an automation environment; a data extraction module retrieving data from at least one of the identified data sources; a data mapping module applying a first algorithm to map the retrieved data to a predetermined ontology; a data storage module storing timeseries of the mapped data in a data store; a data merging module merging the mapped data into the data store; a data enrichment module configured to apply a second algorithm to identify patterns in the merged data and enrich the data based on one or more identified patterns; and a data access module providing one or more APIs or one or more real-time streams comprising the enriched data. In some embodiments, the automation environment comprises at least one networked industrial or commercial automation system. In various embodiments, the plurality of data sources comprises at least one device, at least one PLC, at least one automation controller, at least one data file, at least one cloud service, or a combination thereof. In some embodiments, the plurality of data sources comprises at least one device utilizing a first communications protocol and at least one device utilizing a second communications protocol, wherein the first communications protocol is different from the second communications protocol. In various embodiments, the plurality of data sources comprises at least 1,000, at least 10,000, or at least 100,000 data sources. In some embodiments, the data source discovery module identifies the plurality of data sources by passive discovery, active discovery, target interrogation, or a combination thereof. In further embodiments, the passive discovery comprises observing traffic on a network. In still further embodiments, the passive discovery comprises identifying an origin or a destination for the traffic on the network. In further embodiments, the active discovery comprises IP subnet scanning on a network, port scanning on a network, issuing protocol specific discovery commands (such as whois commands) on a network, or a combination thereof. In further embodiments, the target interrogation comprises introspecting at least one PLC on a network. In some embodiments, the data extraction module retrieves the data on a schedule, in response to an event, or a combination thereof. In some embodiments, the first algorithm comprises, a logic schema, a set of rules, a machine learning model, a statistical model, or a combination thereof. In some embodiments, the data store comprises a graph database, wherein each vertex in the graph comprises a timeseries store to capture data changes over time. In further embodiments, the data merging module merges the mapped data into the data store by matching mapped data with evolved vertices in the graph and merging any new properties, shape details, or relationships into the matched vertices and any timeseries data recorded in the vertex's timeseries store. In further embodiments, the vertices, edges, properties, and underlying data is substantially continuously updated to reflect the state of the extracted data. In further embodiments, the data enrichment module enriches the data creating, updating, or deleting vertices in the graph, edges in the graph, vertex properties in the graph, or edge properties in the graph. In further embodiments, the data enrichment module applies the second algorithm to identify patterns in the graph, the timeseries, or both the graph and the timeseries. In some embodiments, the application comprises a plurality of data enrichment modules, each configured to generate a specific enrichment. In further embodiments, the application further comprises a module contributing enrichments back to the graph database with origin tagging, wherein the origin tagging identifies the data enrichment module that generated the enrichment. In some embodiments, the second algorithm comprises a statistical analysis, a machine learning model, or a combination thereof. In some embodiments, the modules perform their configured functions automatically and substantially continuously.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1:
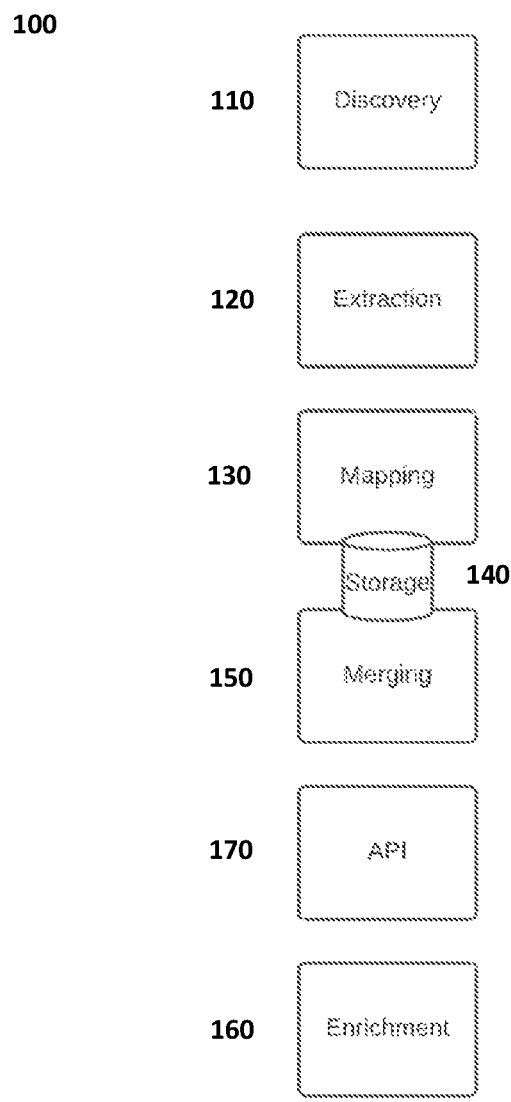
FIG. 1 shows a non-limiting example of a schematic diagram; in this case, a schematic diagram showing components (e.g., modules, mechanisms, etc.) utilized by embodiments described herein.

Described herein, in certain embodiments, are computer-implemented methods comprising: identifying a plurality of data sources associated with an automation environment; retrieving data from at least one of the identified data sources; applying a first algorithm to map the retrieved data to a predetermined ontology; merging the mapped data into a data store comprising timeseries of the mapped data; applying a second algorithm to identify patterns in the merged data and enriching the data based on one or more identified patterns; and providing one or more APIs or one or more real-time streams to provide access to the enriched data.

Also described herein, in certain embodiments, are platforms and systems comprising at least one computing device comprising at least one processor, a memory, and instructions executable by the at least one processor to create an application comprising: a data source discovery software module configured to identify a plurality of data sources associated with an automation environment; a data extraction software module configured to retrieve data from at least one of the identified data sources; a data mapping software module configured to apply a first algorithm to map the retrieved data to a predetermined ontology; a data storage software module configured to store timeseries of the mapped data in a data store; a data merging software module configured to merge the mapped data into the data store; a data enrichment software module configured to apply a second algorithm to identify patterns in the merged data and enrich the data based on one or more identified patterns; and a data access software module configured to provide one or more APIs or one or more real-time streams comprising the enriched data.

Also described herein, in certain embodiments, are non-transitory computer-readable storage media and devices encoded with instructions executable by one or more processors to provide an application comprising: a data source discovery module identifying a plurality of data sources associated with an automation environment; a data extraction module retrieving data from at least one of the identified data sources; a data mapping module applying a first algorithm to map the retrieved data to a predetermined ontology; a data storage module storing timeseries of the mapped data in a data store; a data merging module merging the mapped data into the data store; a data enrichment module configured to apply a second algorithm to identify patterns in the merged data and enrich the data based on one or more identified patterns; and a data access module providing one or more APIs or one or more real-time streams comprising the enriched data.

Certain Definitions

Unless otherwise defined, all technical terms used herein have the same meaning as commonly understood by one of ordinary skill in the art to which the present subject matter belongs.

As used in this specification and the appended claims, the singular forms "a," "an," and "the" include plural references unless the context clearly dictates otherwise. Any reference to "or" herein is intended to encompass "and/or" unless otherwise stated.

As used herein, the "Internet of Things" or "IoT" refers to the network of physical devices, buildings, vehicles, and other objects that feature an IP address for internet network connectivity for exchanging data, wherein the network comprises, for example, ethernet, IP, serial buses, and/or other forms of communication between two or more IoT devices.

Reference throughout this specification to "some embodiments," "further embodiments," or "a particular embodiment," means that a particular feature, structure, or characteristic described in connection with the embodiment is included in at least one embodiment. Thus, the appearances of the phrase "in some embodiments," or "in further embodiments," or "in a particular embodiment" in various places throughout this specification are not necessarily all referring to the same embodiment. Furthermore, the particular structures, features, or characteristics may be combined in any suitable manner in one or more embodiments.

Automation Environment

In some embodiments, the platforms, systems, and methods described herein are implemented in relation to an automation environment. In further embodiments, the automation environment comprises electronically controllable equipment with one or more sensors, one or more actuators, and/or one or more effectors, as well as one or more automation controllers—either centralized and/or distributed. As this environment is the target of the logic and functionality described herein, the environment, in some cases, exists before the platforms, systems, and methods described herein are applied to it. In other cases, the environment is implemented with, e.g., proximate in time to, the platforms, systems, and methods described herein.

Many automation environments are suitable, including, by way of non-limiting examples, industrial environments, such as manufacturing environments and assembly environments, infrastructure, transportation, freight or shipping environments, smart cities, agricultural environments, military environments, law enforcement environments, commercial environments, such as smart building environments, smart office environments, healthcare environments, and retail environments, as well as residential environments, such as smart home environments, and the like. In some embodiments, the automation environments include cloud storage and/or computing system.

In various embodiments, the electronically controllable equipment comprises, by way of non-limiting examples, a smart manufacturing device (e.g., a robot, manufacturing actuator, assembly line sensor, etc.), a utility device (e.g., a water meter, transformer, gas meter, etc.), pipeline monitoring device, power plant monitoring device, electrical grid monitoring device, an environmental sensor (e.g., a carbon dioxide sensor, pollution detector, salinity meter, light meter, etc.), a weather sensor (e.g., humidity sensor, temperature sensor, rain gauge, anemometer, barometer, etc.), a transportation asset (e.g., a car, truck, watercraft, train, bus, aircraft, unmanned vehicle, GPS receiver, etc.), a freight or shipping asset (e.g., a shipping container, cargo, truck, rail car, watercraft, aircraft, etc.), a smart city device (e.g., a parking meter, utility meter, lighting device, traffic monitoring camera, emergency calling device, etc.), an agriculture device (e.g., a farming machine, soil sensor, irrigation device, etc.), a homeland security device (e.g., a body scanner, metal detector, radiation detector, biological agent detector, weapon, vehicle, drone, perimeter intrusion detector, gunfire locator, breathalyzer, etc.), a smart office device (e.g., an access control device, security system, HVAC system, vertical lifts, fire safety system, lighting system, printer, coffee maker, etc.), a point-of-sale (PoS) system (e.g., a payment device, receipt printer, barcode or QR code scanner, etc.), a health care device (e.g., a drug infusion pump, pacemaker, defibrillator, patient health monitoring device, etc.), as well as a smart home device (e.g., a security system, door lock, lighting device, appliance, thermostat, smoke detector, virtual assistant, smart speaker, etc.), and the like.

Data Sources

As described herein, in some embodiments, the automation environment comprises one or more pieces of electronically controllable equipment. In further embodiments, the electronically controllable equipment further comprises one or more of the following components: a microcontroller (MCU), a microprocessor (MPU), a memory or storage component, firmware, software, a networking/communications component, a sensing component (e.g., a sensor), an electronic circuit connected to the sensing component, an actuating component (e.g., an actuator and/or an effector), an electronic circuit connected to the actuating component, and an energy source. In some embodiments, one or more of the components are physically separate from a piece of electronically controllable equipment. In some embodiments, one or more of the components are integrated with, or embedded in, a piece of electronically controllable equipment.

In some embodiments, the automation environment comprises one or more cloud storage and/or computing systems, which in some cases are located remotely from the data integration pipeline. For example, some devices (e.g., pieces of electronically controllable equipment) are configured to communicate with a cloud storage and/or computing system. In these embodiments, the data integration pipeline discovers and/or extracts data from cloud APIs. In some embodiments, the data integration pipeline processes data both from on-premise systems and cloud systems.

In some embodiments, the networking/communication element includes a receiver, a transmitter, and/or a transceiver. In further embodiments, the networking/communication element comprises a radio frequency (RF) transceiver with an antenna or connection for an external antenna. Suitable transceivers include, by way of non-limiting examples, a Wi-Fi transceiver, a cellular transceiver, a Bluetooth transceiver, and the like.

In some embodiments, the electronically controllable equipment, or components thereof, comprises an IP address for internet connectivity. In further embodiments, the equipment may be associated with a MAC address or an SSID. It is understood that equipment may connect with other devices through wired or wireless connections, which allow for transfer (e.g., transmission, reception, or both) of data.

In some embodiments, the automation environment comprises one or more networks via which the electronically controllable equipment, or components thereof, sends and/or receives data. In various embodiments, the network comprises ethernet, IP, serial buses, and other forms of communication between two or more IoT devices. In further embodiments, the one or more networks comprise one or more IoT networks, one or more data packet-switched networks, one or more wireless sensor networks (WSN), and/or one or more wireless sensor and actuator networks (WSAN). In various embodiments, a network described herein is wireless network utilizing Wi-Fi, WiMAX, ZigBee, Z-Wave, Bluetooth, Bluetooth Low Energy (BLE), Near-Field Communication (NFC), or Light-Fidelity (Li-Fi). In some embodiments, a network described herein is wireless network utilizing LTE or 5G. In some embodiments, a network described herein is wireless network utilizing a low-power wide-area network (LPWAN) protocol, such as LoRa. In other embodiments, a network described herein is wired network utilizing Ethernet, serial, RS422 or RS485 serial bus, 1-Wire, CAN, DMX, or power line communication.

In some embodiments, one or more devices form nodes in the network. In some embodiments, a network described herein includes a central node for controlling the network. In some embodiments, the automation environment comprises electronically controllable equipment, or components there, that have hierarchical relationships, such as a controller/controlled relationship, a master/slave relationship, or the like. In some embodiments, a network described herein has a distributed architecture to reduce the impact of a failed device or node. In some embodiments, a network described herein consists of a peer-to-peer relationship between two or more devices.

The automation environment suitably comprises a wide range of numbers of data sources, including, by way of examples, pieces of electronically controllable equipment, local and remote data stores, and remote cloud computing services/resources, including APIs to provide data from remote computing services/resources. In various embodiments, the automation environment suitably comprises, by way of non-limiting examples, at least 5, at least 10, at least 50, at least 100, at least 500, at least 1,000, at least 5,000, at least 10,000, at least 50,000, or at least 100,000 data sources, including increments therein. In various further embodiments, the automation environment suitably comprises, by way of non-limiting examples, at least 500,000, at least 1,000,000, at least 5,000,000, at least 10,000,000, at least 50,000,000, at least 100,000,000, or at least 500,000,000 data sources, including increments therein.

In some embodiments, the automation environment comprises an automation controller, either centralized or distributed. For example, in some embodiments, the automation environment comprises one or more programmable logic controllers (PLC). A PLC is a microprocessor-based controller with programmable memory used to store program instructions and functions. In some embodiments, one or more of the PLCs are ruggedized. In various embodiments, a PLC comprises a processor unit (MCU or the MPU) which interprets inputs, executes the control program stored in memory, and sends output signals, a power supply unit which, in some cases, converts AC voltage to DC, a memory unit storing data from inputs and program instructions to be executed by the processor unit, an input and output interface, by which the PLC sends data to external devices and receives data from external devices, and a communications interface to receive and transmit data on communication networks. In further embodiments, a PLC comprises a real-time operating system, such as OS-9, Sedona, Niagara, or VxWorks. In various embodiments, PLC functionality includes, by way of examples, sequential relay control, motion control, process control, distributed control systems, and networking. In particular embodiments, a PLC is programmed with a device used to develop and later download a program into the memory of the PLC. The programming device, in various cases, includes a desktop console, special software on a personal computer, or a handheld programming device. In some cases, the program is downloaded to the PLC directly or over a network and stored either in non-volatile flash memory or battery-backed-up RAM.

In some embodiments, the MCU or the MPU receives data from a sensing component and transmits the data to the transmitter or transceiver to be transmitted to other remotely located elements within a network. In some embodiments, the receiver or transceiver receives data, for example, control data from remotely located devices, and such data gets relayed to the MCU or the MPU to generate commands to one or more other components. In such embodiments, a sensing component and/or an actuation component performs one or more functions(s) based on the received command. In some embodiments, an electrical circuit is utilized in data transfer among a sensing component, an actuation component, the MCU or MPU, and the networking/communications element.

Many sensors are suitable including, by way of non-limiting examples, GPS receivers, wearable sensors, mobile sensors, fixed sensors, and the like. In various embodiments, the electronically controllable equipment, or components thereof, and/or networks described herein comprise one or more of: an audio/acoustic sensor, a breathalyzer, a temperature sensor, a carbon dioxide sensor, a carbon monoxide sensor, an infrared sensor, an oxygen sensor, an ozone monitor, a pH sensor, a smoke detector, an electrical current sensor, an electrical voltage detector, a magnetometer, a metal detector, a radio direction finder, an air flow meter, an anemometer, a flow sensor, a gas meter, a water meter, a Geiger counter, an altimeter, an air speed indicator, a depth gauge, a gyroscope, a compass, an odometer, a shock detector, a barometer, a pressure gauge, a thermometer, a proximity sensor, a motion detector, an occupancy sensor, an inertial sensor, a gyroscope, or any combination thereof, and in some embodiments, sensor data comprises information obtained from any of the sensors described herein. Other examples of sensors include, but are not limited to, location sensors, vision sensors (e.g., imaging devices capable of detecting visible, infrared, or ultraviolet light, such as cameras, etc.), proximity sensors (e.g., ultrasonic sensors, LiDAR, time-of-flight cameras, etc.), inertial sensors (e.g., accelerometers, gyroscopes, inertial measurement units (IMUs), etc.), and field sensors (e.g., magnetometers, electromagnetic sensors, etc.). In particular embodiments, one or more sensors are configured to measure health parameters such as heart rate, pulse, electric signals from the heart, blood oxygen levels, blood pressure, blood sugar level, and the like. In particular embodiments, one or more sensors are configured to measure environmental parameters such as light, motion, temperature, pressure, humidity, vibration, magnetic field, sound, smoke, carbon monoxide, radiation, hazardous chemicals, acid, base, reactive compounds, volatile organic compounds, smog, and the like.

Any suitable number and combination of sensors can be used, such as one, two, three, four, five, or more sensors. Optionally, the data can be received from sensors of different types (e.g., two, three, four, five, or more types). Sensors of different types may measure different types of signals or information and/or utilize different types of measurement techniques to obtain data. For instance, the sensors may include any suitable combination of active sensors (e.g., sensors that generate and measure energy from their own source) and passive sensors (e.g., sensors that detect available energy).

Suitable actuators include, by way of non-limiting examples, electric (e.g., a motor, servo, solenoid, piezoelectric actuator, etc.), hydraulic, pneumatic (e.g., vacuum- or compressed gas-based actuators), magnetic, thermal (e.g., shape memory alloy-based actuators), soft, and mechanical actuators.

Suitable effectors include, by way of non-limiting examples, impactive, ingressive, astrictive, and contigutive effectors.

Overview of Exemplary Embodiments

The platforms, systems, and methods described herein interact with an automation environment and are implemented with multiple suitable architectures. Non-limiting examples are provided herein.

Referring to FIG. 1, in a particular embodiment, the platforms and systems 100 include, and methods utilize a data source discovery module 110, a data extraction module 120, data mapping 130 and data merging modules 150 in communication with a storage module 140 (which in some cases comprises a database), at least one data enrichment module 160, and one or more APIs 170 (and/or real-time data streams, live data feeds, etc.).

Figure 2:
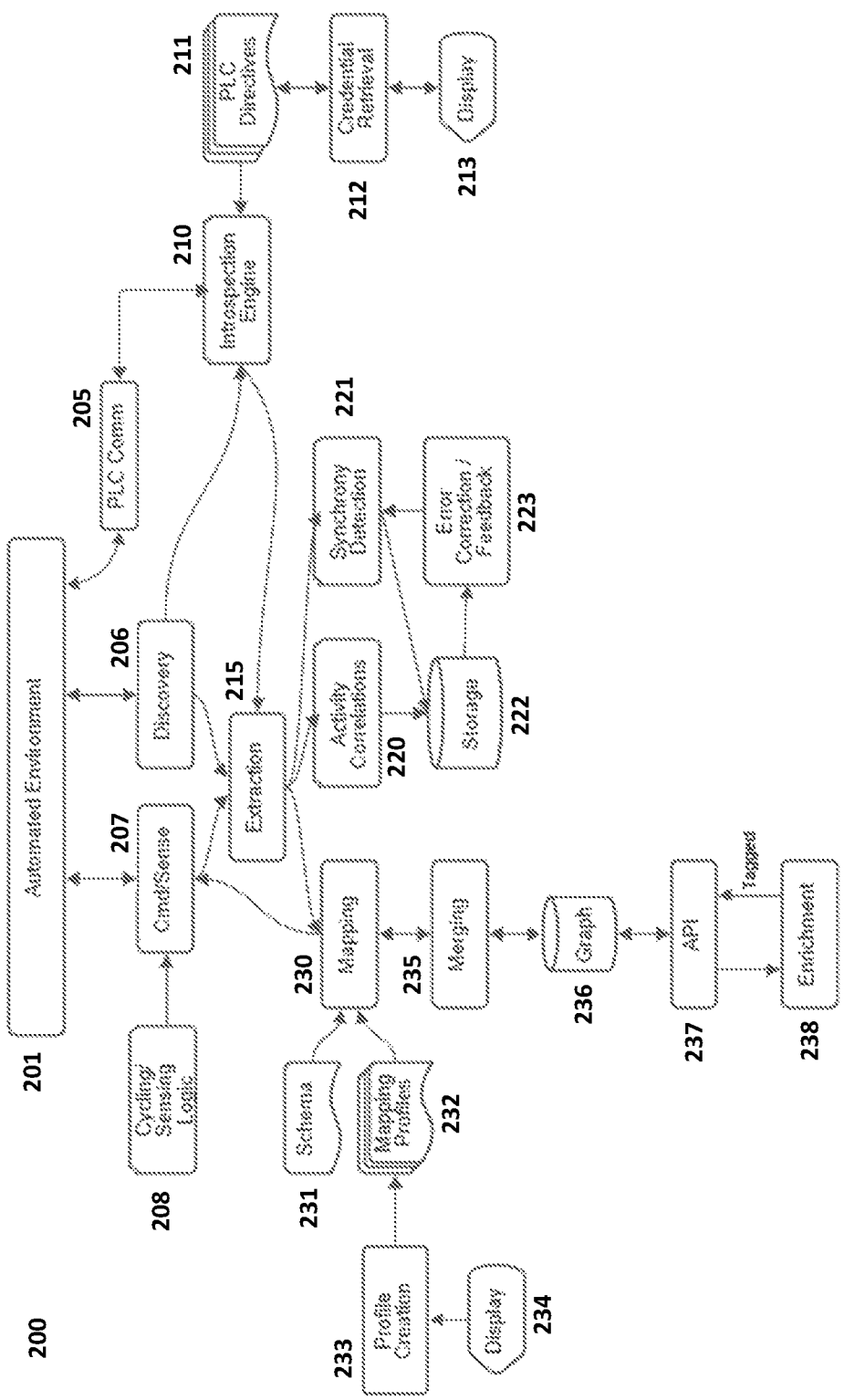
FIG. 2 shows a non-limiting example of a schematic diagram; in this case, a schematic diagram illustrating overall architecture and procedural aspects of the platforms, systems, and methods described herein.

Referring to FIG. 2, in a particular embodiment, the overall platforms and systems 200 are implemented in relation to an automation environment 201, and the methods utilize the automation environment 201. In this embodiment, a discovery module 206 and a command/sense module 207 interact directly with the automation environment 201 to conduct protocols to gain data about the environment and feed the data to an extraction module 215. The discovery module 206 provides data to an introspection engine 210, which communicates with a PLC communications module 205. In this embodiment, the introspection engine 210 receives one or more PLC directives 211, which may require credential retrieval 212 and presentation of an interface for showing credentials on a display 213 and/or receiving credentials, and the introspection engine 210 sends the PLC directives 211 to the PLC communications module 205 for issuance into the automation environment 201. Further, in this embodiment, a cycling/sensing logic module 208 provides instruction to the command/sense module 207 for interaction with the automation environment 201.

Continuing to refer to FIG. 2, in this particular embodiment, the command/sense module 207, the discovery module 206, and the introspection engine 210 provide data to the extraction module 215. In this embodiment, the extraction module 215 provides data to the activity correlations module 220 and the synchrony detection module 221, which are in communication with a storage module 222 and an error correction and feedback mechanism 223. In this embodiment, the extraction module 215 also provides data to the mapping module 230. By way of example, the mapping module 230 receives a mapping schema 231 and one or more mapping profiles 232, which may require profile creation 233 and presentation of an interface for showing profiles on a display 234 and/or receiving profiles. The mapping module 230 utilizes the schema 231 and the one or more profiles 232 to map the data extracted by the extraction module 215 and communicates the output to a merging module 235. Finally, in this embodiment, the merging module 235 is in communication with a graph database 236. An enrichment module 238 provides data enrichments, such as tagging (e.g., origin tagging, etc.), and access to the graph database 236 and the enrichments is provided via one or more APIs 237.

Figure 3:
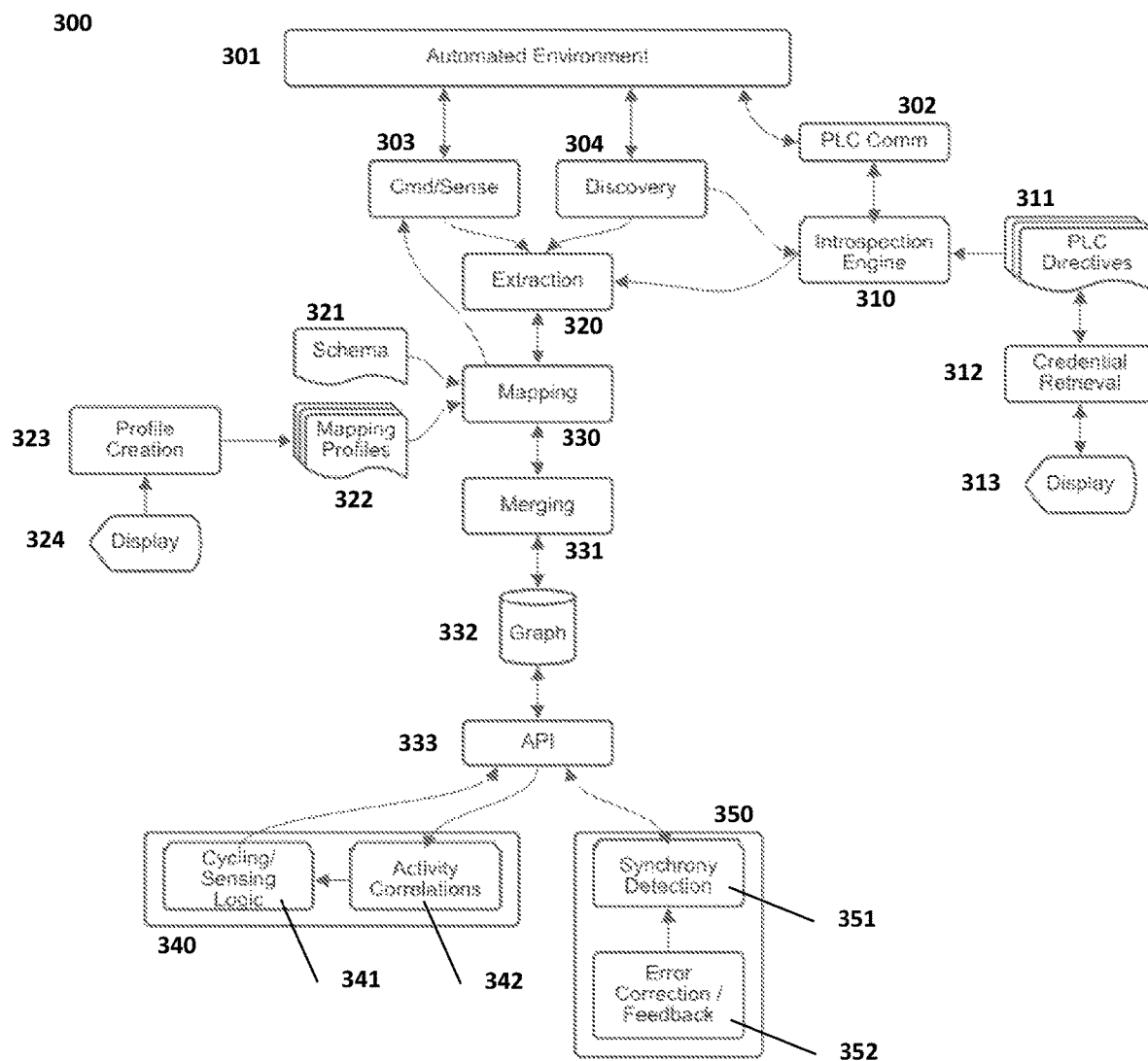
FIG. 3 shows a non-limiting example of a schematic diagram; in this case, a schematic diagram illustrating architecture and procedural aspects of the platforms, systems, and methods for providing an automated data integration pipeline with data storage and enrichment according to embodiments described herein.

Referring to FIG. 3, in a particular embodiment, the automated data integration pipeline with storage and enrichment 300 is implemented in relation to an automation environment 301, and the methods utilize the automation environment 301. In this embodiment, a discovery module 304 and a command/sense module 303 interact directly with the automation environment 301 to conduct protocols to gain data about the environment and feed the data to an extraction module 320. The discovery module 304 provides data to an introspection engine 310, which communicates with a PLC communications module 302. In this embodiment, the introspection engine 310 receives one or more PLC directives 311, which may require credential retrieval 312 and presentation of an interface for showing credentials on a display 313 and/or receiving credentials, and the introspection engine 310 sends the PLC directives 311 to the PLC communications module 302 for issuance into the automation environment 301.

Continuing to refer to FIG. 3, in this particular embodiment, the command/sense module 303, the discovery module 304, and the introspection engine 310 provide data to the extraction module 320. In this embodiment, the extraction module 320 provides data to a mapping module 330. By way of example, the mapping module 330 receives a mapping schema 321 and one or more mapping profiles 322, which may require profile creation 323 and presentation of an interface for showing profiles on a display 324 and/or receiving profiles. The mapping module 330 utilizes the schema 321 and the one or more profiles 322 to map the data extracted by the extraction module 320 and communicates the output to a merging module 331. In this embodiment, the merging module 331 is in communication with a graph database 332. Further, in this embodiment, one or more APIs 333 are provided to create access to the content of the graph database 332 and also to allow enrichment modules 340, 350 to add data enrichments to the database. By way of example, a first enrichment module 340 includes an activity correlation module 342 and a cycling/sensing logic module 341. In this example, an API 333 provides data for data sources in the automation environment 301 to the activity correlations module 342, which communicates with the cycling/sensing logic module 341 to determine data source enrichments, which are further provided back to an API 333 for integration in the graph database 332. By way of another example, a second enrichment module 350 includes synchrony detection module 351 and an error correction/feedback mechanism 352. In this example, an API 333 provides data for data sources in the automation environment 301 to the synchrony detection module 351, which communicates with the error correction/feedback mechanism 352 to determine data source enrichments, which are further provided back to an API 333 for integration in the graph database 332.

Figure 4:
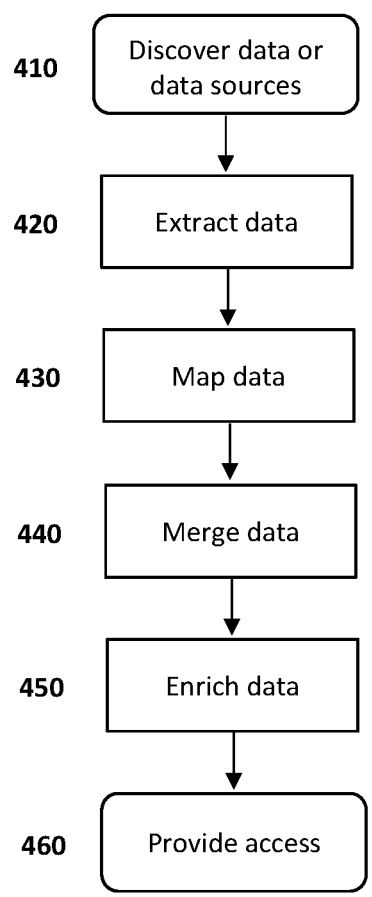
FIG. 4 shows a non-limiting example of a process flow diagram; in this case, a process flow diagram illustrating a data integration, storage, and enrichment process according to embodiments described herein.

Referring to FIG. 4, in a particular embodiment, a process for providing an automated data integration pipeline with storage and enrichment 400 begins with discovery of one or more data and/or data sources 410. Discovery, in this embodiment, comprises one or more of passive discovery, active discovery, and target interrogation methodologies. The next step is to extract data 420 from some or all of the discovered data (e.g., data files, data shares, data repositories, or data resources and/or some or all of the discovered data sources (e.g., controllers, hubs, IoT devices, sensors, actuators, and the like). In this embodiment, extraction comprises sending one or more instructions and/or requests to each data source, utilizing the automation protocol native to each data source. Further, in this embodiment, data extraction is performed on a schedule, in response to an event, or pushed from the source directly to an extraction module, or a combination of these, on an overall, per data source, or per group of data source basis. Next, extracted data is mapped 430 from the source format to an ontology, according to a schema and a plurality of mapping profiles. Once mapped to the known ontology, the data is merged 440 (not just loaded or added) to a data storage mechanism, such as a graph database, which contains a living representation of the data, the relationships among the data, and any enrichments that were introduced by subsequent components. Next, the merged data is enriched 450 by monitoring real-time streams of data (e.g., streams of graph and timeseries data in a graph database) to identify patterns utilizing pattern matching, statistical analysis, machine learning, or the like. In this embodiment, Finally, access to the normalized, merged, and enriched data is provided 460 utilizing APIs, data streams, and/or data feeds, and the like. In this embodiment, the processed data is consumed by other applications, running locally, remotely, or both, that will access the data in real-time to provide information and services not otherwise available.

Data or Data Source Discovery Mechanism

One component of the platforms and systems described herein, and utilized by the methods described herein is the data or data source discovery mechanism. See, e.g., FIG. 1 at 110, FIG. 2 at 206, and FIG. 3 at 304. This will vary based on the environment the system is targeting but, in various embodiments, includes one or more of: passive discovery, active discovery, and target interrogation. Passive discovery is typically done by observing network traffic, whether IP, serial, or otherwise, between the potential data sources. When a known protocol is used, the origin and destination are recorded as a potential data source. Active discovery is usually protocol specific, but can range from "whois" commands in protocols like BACnet to IP subnet and port scanning for IP based systems. Again, when a device is found that speaks a desired protocol, it is recorded as a potential data source. Lastly, target interrogation includes actively speaking one or more protocols to a potential target to obtain additional information. In general, a known or discovered device is interrogated to find out about other known devices—and when more devices are found, they are similarly interrogated. Additionally, data sources can also be found in file shares or be manually entered, such as a cloud service.

A particular exemplary methodology for target interrogation is found in U.S. patent application Ser. No. 17/372,275, entitled SUBTENDED DEVICE MAPPING THROUGH CONTROLLER INTROSPECTION, filed on Jul. 9, 2021 and listing as inventors Shaun Cooley, Jose de Castro, and Jason Koh, which is hereby incorporated by reference in its entirety. This exemplary methodology utilizes communication methods set up for programming and configuration of controllers by human technicians. A collection of protocol specific PLC introspection directives is assembled. Each of these directives drives an introspection engine to reach in to the controller to obtain the necessary information. The engine obtains the make/model of a controller, finding the appropriate introspection directives, executing the sequence of commands, and then processing the final output. In this example, the data or data source discovery mechanism discovers devices that are subtended to a controller by masquerading as a human technician in order to obtain the controller's internal configuration and programming.

Data Extraction System

Another component of the platforms and systems described herein, and utilized by the methods described herein is the data extraction mechanism. See, e.g., FIG. 1 at 120, FIG. 2 at 215, and FIG. 3 at 320. After the data or data source discovery mechanism produces a list of potential data sources, the data extraction component is responsible for extracting data from each source. This is done by leveraging the native protocol, such as BACnet, modbus, S7, or other automation protocol that the source is able to speak or respond on, or the file format if pulling data from a file, such as a CSV. In various embodiments, data is retrieved on a schedule, in response to an event, as a result of passively observing communications among data sources, or pushed from the source directly to this extraction component, or some combination of these. As this component receives data, it actively forwards it to the mapping mechanism, which typically transits a network. In preferred embodiments, the receiving end of this data would store the data in its raw form so that the raw data could be replayed in to the system if any of the subsequent components are improved after the data's initial pass through the system.

Data Mapping Mechanism

Another component of the platforms and systems described herein, and utilized by the methods described herein is the data mapping mechanism. See, e.g., FIG. 1 at 130, FIG. 2 at 230, and FIG. 3 at 330. The mapping mechanism is responsible for mapping data from the source format to an ontology, such as a strongly-typed ontology, used by subsequent components in the pipeline. This component optionally comprises a manually crafted set of mapping rules or logic (including those comprising one or more heuristics) to take a known input schema and produce an output schema, such as an XSLT file (Extensible Stylesheet Language Transformations) or even simple field mapping (A→7). In some embodiments, this mapping mechanism optionally comprises complex machine learning based transformation that is trained from interactive data transformation performed by humans or by the data integration pipeline, which improves over time. Example machine learning models include, by way of examples, regular or deep neural networks, support vector machines, Bayesian models, linear regression, logistic regression, k-means clustering, or the like.

A particular exemplary methodology for mapping and normalizing extracted data is found in U.S. patent application Ser. No. 17/372,256, entitled DATA MAPPING BASED ON DEVICE PROFILES, filed on Jul. 9, 2021 and listing as inventors Shaun Cooley, Jose de Castro, and Jason Koh, which is hereby incorporated by reference in its entirety. This exemplary methodology utilizes a data mapping mechanism positioned between the discovered devices and the target schema or ontology and is responsible for converting the data extracted from devices to the target ontology by applying device mapping profiles that were looked up in the storage and lookup system for device mapping profiles using the make/model/firmware or fingerprint of extracted from the device providing data.

Data Storage System

Another component of the platforms and systems described herein, and utilized by the methods described herein is the data storage mechanism. See, e.g., FIG. 1 at 140, FIG. 2 at 236, and FIG. 3 at 332. In some embodiments, a relational database is used. In preferred embodiments, a graph database is used wherein each vertex in the graph also has a timeseries store to capture data changes over time. Although a timeseries store and a graph database are designed for completely different data models, a federation of the two allows subsequent components and end users of data to easily retrieve timeseries data without concern for structural enrichments that occur in the graph. Other specialized databases could also be added into this federation framework, such as structural data or document stores. It is important that heterogeneous data moving through the pipeline is stored so that it can be further processed and enriched.

Data Merging Method

Another component of the platforms and systems described herein, and utilized by the methods described herein is the data merging mechanism. See, e.g., FIG. 1 at 150, FIG. 2 at 235, and FIG. 3 at 331. The data merging method takes data that has been mapped to the system's ontology by the mapping component and merges it into the data storage mechanism, described above. It is important that the mapped data is merged and not just simply loaded as the data storage mechanism contains a living representation of the data, the relationships among the data, and any enrichments that were introduced by subsequent components. Simply loading the data would introduce a static view of data that is incapable of evolving further and similarly wouldn't align with the enriched and evolved model. The merge process, in some embodiments, includes matching mapped source data with evolved vertices in the graph, which optionally involves knowing both provenance and history of each vertex in the graph. In further embodiments, once matched, any new properties, shape details, or relationships can be merged into the matched vertices and any timeseries data recorded in the vertex's timeseries store. At this point data is simultaneously available to API callers, stream destinations, and the enrichment mechanisms.

Data Enrichment Mechanism

Another component of the platforms and systems described herein, and utilized by the methods described herein is the data enrichment mechanism. See, e.g., FIG. 1 at 170, FIG. 2 at 238, and FIG. 3 at 340, 350. Data enrichment mechanisms watch the real-time stream of graph and timeseries data in order to enrich the graph by creating, updating, or deleting vertices, edges (relationships), or vertex/edge properties in the graph. In general, these enrichment mechanisms look for patterns in the graph, the timeseries, or both through mechanisms such as simple pattern matching, statistical analysis, machine learning, or even human processing.

A particular exemplary methodology for data enrichment is found in U.S. patent application Ser. No. 17/372,251, entitled GRAPH DATA ENRICHMENT, filed on Jul. 9, 2021 and listing as inventors Shaun Cooley, Jose de Castro, and Jason Koh, which is hereby incorporated by reference in its entirety. This exemplary methodology utilizes a mechanism to allow downstream processing of graph structure and data to feed back into the graph in order to benefit all other users of the graph through real-time enrichment of vertices, edges, and related data within the graph database. First, in this example, updates to the graph, timeseries data, or both are received, e.g., by scheduled polling of the graph or timeseries data through queries, polling of a changelog, or a real-time feed of changes in the graph or timeseries data being pushed to interested parties (local to the graph or remote). Second, in this example, data enrichments are produced, e.g., by one or more mechanisms in or out of band. In preferred embodiments, multiple instances of data enrichment mechanisms are each configured to produce a specific enrichment and receive graph or timeseries data updates and analyze the new state of the graph through rules based, heuristic, statistical, or machine learning based systems to determine if an enrichment should be created, updated, or deleted. Finally, in this example, enrichments are contributed back to the graph database, timeseries data, or both with origin tagging, e.g., by receiving a stream of vertex, edge, and property creation, update, and delete requests from the various instances of the data enrichment(s) components, and merging the deltas into the graph. In preferred embodiments, each delta merged into the graph is tagged with the identity of the enrichment component that created it (e.g., origin tagging) so that future updates or deletions can be properly applied, thus avoiding duplicate or abandoned elements in the graph.

Further examples of data enrichment are provided in U.S. patent application Ser. No. 17/372,238, entitled AUTOMATIC DISCOVERY OF RELATIONSHIPS AMONG EQUIPMENT THROUGH AUTOMATED CYCLING AND OBSERVATION, filed on Jul. 9, 2021 and listing as inventors Shaun Cooley, Jose de Castro, and Jason Koh, U.S. patent application Ser. No. 17/372,242, entitled AUTOMATIC DISCOVERY OF RELATIONSHIPS AMONG EQUIPMENT THROUGH OBSERVATION OVER TIME, filed on Jul. 9, 2021 and listing as inventors Shaun Cooley, Jose de Castro, and Jason Koh, and U.S. patent application Ser. No. 17/372,267, entitled AUTOMATIC DISCOVERY OF AUTOMATED DIGITAL SYSTEMS THROUGH LINK SALIENCE, filed on Jul. 9, 2021 and listing as inventors Shaun Cooley, Jose de Castro, and Jason Koh, each of which are hereby incorporated by reference in its entirety.

APIs and Streams for Accessing the Normalized, Merged, and Enriched Data

Another component of the platforms and systems described herein, and utilized by the methods described herein is one or more APIs and/or real-time data streams and/or live data feeds. See, e.g., FIG. 1 at 160, FIG. 2 at 237, and FIG. 3 at 333. The last component needed for the platforms, systems, and methods described herein is some combination of APIs and streams for accessing the normalized, merged, and enriched data. While this data pipeline adds immense value to the original raw data that entered the pipeline, the resulting data would be useless if it couldn't be accessed. In various embodiments, the final destination of the processed data is other applications, running either locally or remotely, that will access the data either by polling an API for new data or using a callback, webhook, or web socket type mechanism to receive a stream of data in real-time. These applications must also be aware of any enrichments that came into existence after the initial delivery of data, so all delivered data must be uniquely identifiable so subsequent updates can be correlated.

In a preferred embodiment, this pipeline can also process data in reverse to push changes that are made to the data storage system, by enrichment mechanisms or other users of the API, back through the merging and mapping component and in to the automation environment as commands.

Computing System

Figure 5:
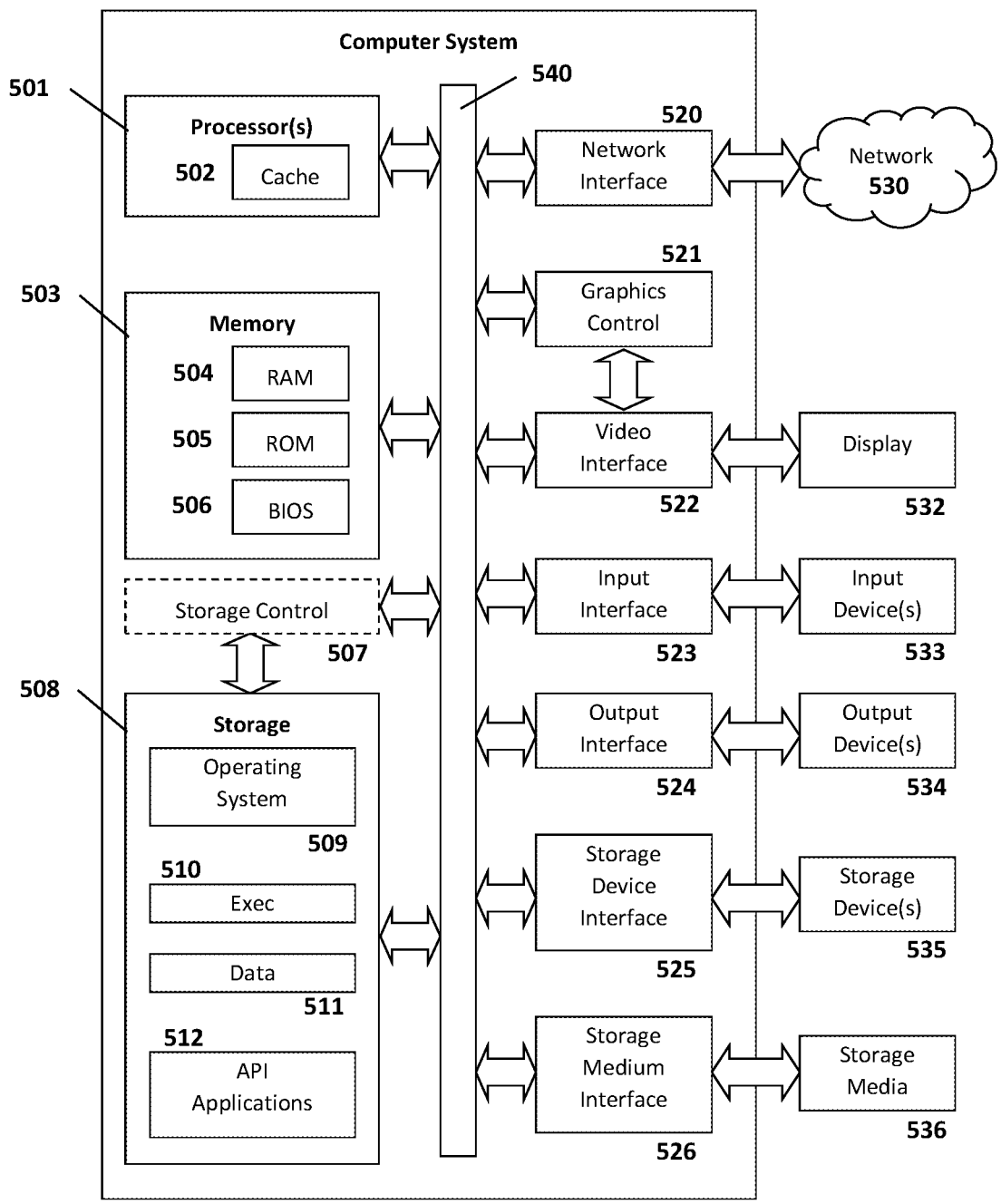
FIG. 5 shows a non-limiting example of a computing device; in this case, a device with one or more processors, memory, storage, and a network interface.

Referring to FIG. 5, a block diagram is shown depicting an exemplary machine that includes a computer system 500 (e.g., a processing or computing system) within which a set of instructions can execute for causing a device to perform or execute any one or more of the aspects and/or methodologies for static code scheduling of the present disclosure. The components in FIG. 5 are examples only and do not limit the scope of use or functionality of any hardware, software, embedded logic component, or a combination of two or more such components implementing particular embodiments.

Computer system 500 may include one or more processors 501, a memory 503, and a storage 508 that communicate with each other, and with other components, via a bus 540. The bus 540 may also link a display 532, one or more input devices 533 (which may, for example, include a keypad, a keyboard, a mouse, a stylus, etc.), one or more output devices 534, one or more storage devices 535, and various tangible storage media 536. All of these elements may interface directly or via one or more interfaces or adaptors to the bus 540. For instance, the various tangible storage media 536 can interface with the bus 540 via storage medium interface 526. Computer system 500 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 500 includes one or more processor(s) 501 (e.g., central processing units (CPUs), general purpose graphics processing units (GPGPUs), or quantum processing units (QPUs)) that carry out functions. Processor(s) 501 optionally contains a cache memory unit 502 for temporary local storage of instructions, data, or computer addresses. Processor(s) 501 are configured to assist in execution of computer readable instructions. Computer system 500 may provide functionality for the components depicted in FIG. 5 as a result of the processor(s) 501 executing non-transitory, processor-executable instructions embodied in one or more tangible computer-readable storage media, such as memory 503, storage 508, storage devices 535, and/or storage medium 536. The computer-readable media may store software that implements particular embodiments, and processor(s) 501 may execute the software. Memory 503 may read the software from one or more other computer-readable media (such as mass storage device(s) 535, 536) or from one or more other sources through a suitable interface, such as a network interface 520. The software may cause processor(s) 501 to carry out one or more processes or one or more steps of one or more processes described or illustrated herein. Carrying out such processes or steps may include defining data structures stored in memory 503 and modifying the data structures as directed by the software.

The memory 503 may include various components (e.g., machine readable media) including, but not limited to, a random access memory component (e.g., RAM 504) (e.g., static RAM (SRAM), dynamic RAM (DRAM), ferroelectric random access memory (FRAM), phase-change random access memory (PRAM), etc.), a read-only memory component (e.g., ROM 505), and any combinations thereof. ROM 505 may act to communicate data and instructions unidirectionally to processor(s) 501, and RAM 504 may act to communicate data and instructions bidirectionally with processor(s) 501. ROM 505 and RAM 504 may include any suitable tangible computer-readable media described below. In one example, a basic input/output system 506 (BIOS), including basic routines that help to transfer information between elements within computer system 500, such as during start-up, may be stored in the memory 503.

Fixed storage 508 is connected bidirectionally to processor(s) 501, optionally through storage control unit 507. Fixed storage 508 provides additional data storage capacity and may also include any suitable tangible computer-readable media described herein. Storage 508 may be used to store operating system 509, executable(s) 510, data 511, applications 512 (application programs), and the like. Storage 508 can also include an optical disk drive, a solid-state memory device (e.g., flash-based systems), or a combination of any of the above. Information in storage 508 may, in appropriate cases, be incorporated as virtual memory in memory 503.

In one example, storage device(s) 535 may be removably interfaced with computer system 500 (e.g., via an external port connector (not shown)) via a storage device interface 525. Particularly, storage device(s) 535 and an associated machine-readable medium may provide non-volatile and/or volatile storage of machine-readable instructions, data structures, program modules, and/or other data for the computer system 500. In one example, software may reside, completely or partially, within a machine-readable medium on storage device(s) 535. In another example, software may reside, completely or partially, within processor(s) 501.

Bus 540 connects a wide variety of subsystems. Herein, reference to a bus may encompass one or more digital signal lines serving a common function, where appropriate. Bus 540 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 500 may also include an input device 533. In one example, a user of computer system 500 may enter commands and/or other information into computer system 500 via input device(s) 533. Examples of an input device(s) 533 include, but are not limited to, an alpha-numeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 533 may be interfaced to bus 540 via any of a variety of input interfaces 523 (e.g., input interface 523) including, but not limited to, serial, parallel, game port, USB, FIREWIRE, THUNDERBOLT, or any combination of the above.

In particular embodiments, when computer system 500 is connected to network 530, computer system 500 may communicate with other devices, specifically mobile devices and enterprise systems, distributed computing systems, cloud storage systems, cloud computing systems, and the like, connected to network 530. The network 530 may comprise ethernet, IP, serial buses, and other forms of communication between two or more IoT devices. Communications to and from computer system 500 may be sent through network interface 520. For example, network interface 520 may receive incoming communications (such as requests or responses from other devices) in the form of one or more packets (such as Internet Protocol (IP) packets) from network 530, and computer system 500 may store the incoming communications in memory 503 for processing. Computer system 500 may similarly store outgoing communications (such as requests or responses to other devices) in the form of one or more packets in memory 503 and communicated to network 530 from network interface 520. Processor(s) 501 may access these communication packets stored in memory 503 for processing.

Examples of the network interface 520 include, but are not limited to, a network interface card, a modem, and any combination thereof. Examples of a network 530 or network segment 530 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 530, may employ a wired and/or a wireless mode of communication. In general, any network topology may be used.

Information and data can be displayed through a display 532. Examples of a display 532 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMO-LED) display, a plasma display, and any combinations thereof. The display 532 can interface to the processor(s) 501, memory 503, and fixed storage 508, as well as other devices, such as input device(s) 533, via the bus 540. The display 532 is linked to the bus 540 via a video interface 522, and transport of data between the display 532 and the bus 540 can be controlled via the graphics control 521. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 532, computer system 500 may include one or more other peripheral output devices 534 including, but not limited to, an audio speaker, a printer, a storage device, and any combinations thereof. Such peripheral output devices may be connected to the bus 540 via an output interface 524. Examples of an output interface 524 include, but are not limited to, a serial port, a parallel connection, a USB port, a FIREWIRE port, a THUNDERBOLT port, and any combinations thereof.

In addition or as an alternative, computer system 500 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, and vehicles.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, XML, and document oriented database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, JavaScript, or Silverlight. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, a distributed computing resource, a cloud computing resource, or combinations thereof. In further various embodiments, a software module comprises a plurality of files, a plurality of sections of code, a plurality of programming objects, a plurality of programming structures, a plurality of distributed computing resources, a plurality of cloud computing resources, or combinations thereof. In various embodiments, the one or more software modules comprise, by way of non-limiting examples, a web application, a mobile application, a standalone application, and a cloud computing application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of, for example, automation environment information, data source information, data mapping ontology information, data enrichment information, and API information. In various embodiments, suitable databases include, by way of non-limiting examples, relational databases, non-relational databases, object oriented databases, object databases, entity-relationship model databases, associative databases, XML databases, document oriented databases, and graph databases. Further non-limiting examples include SQL, PostgreSQL, MySQL, Oracle, DB2, Sybase, MongoDB, and the like. Suitable graph databases include, by way of non-limiting examples, ArangoDB, AnzoGraph DB, JanusGraph, Neo4j, Sparksee, Sqrrl Enterprise, and the like. In some embodiments, a database is Internet-based. In further embodiments, a database is web-based. In still further embodiments, a database is cloud computing-based. In a particular embodiment, a database is a distributed database. In other embodiments, a database is based on one or more local computer storage devices.

EXAMPLES

The following illustrative example is representative of embodiments of the software applications, systems, media, and methods described herein and are not meant to be limiting in any way.

Exemplary Use Case

In one of use cases, Company A buys a Factory B, or Company A is looking to integrate data of an existing facility Factory B with another set of data (e.g., data from a Warehouse C owned by Company A) to provide better visibility of the operation of Factory B and/or Warehouse C. In many instances, Factory B may include a number of pieces of equipment that are connected to the internet that feature an IP address, i.e., IoT devices. However, if the accumulated data associated with the IoT devices is generated across a long period of time according to different standards by different service providers, it is quite possible that the data is not in a format that is readily understandable by Company A, and thus cannot provide actionable insight for Company A. For example, the data format may be in a proprietary format that is not useful for people in Company A to understand the operation of Factory B.

Factory B may be an example of an automated environment (e.g., IoT-connected ecosystem). The automated environment of Factory B may comprise electronically controllable equipment. For example, an automobile manufacturing Factory B has assembly line with sensors, actuators, and effectors, lighting systems, HVAC systems with temperature sensors, etc. It will be obvious to those skilled in the art that such electronically controllable equipment and/or devices are provided by way of example only. Each of these pieces of electronically controllable equipment and/or devices may be internet-connected and thus provide data for the operator of Factory B and the management team of Company A. Company A may also own other automobile manufacturing Factories H, I, and J, and a Warehouse C which stores parts for installation, such as brake components for cars. In many cases, each of the facilities B, H, I, J and C has tens of thousands of devices producing data, and they spread across millions of square feet, and use a multitude of protocols. Due to the lack of interoperability between the variety of IoT devices, in terms of both hardware variations and differences in the software running on them, it is hard to develop applications that work across the entire enterprise (i.e., Company A in this example). The following operations explain the solutions provided by the present subject matter to the above-mentioned problems.

The method provided by the present subject matter identifies a plurality of data sources associated with an automation environment. For example, a number of IoT devices are identified as data sources because they are capable of generating data associated with their operation respectively. The assembly line sensors, lighting system sensors, temperature sensors, etc. of Factory B may be identified as data sources in this case. The data source identification process may involve passive discovery, active discovery, and/or target interrogation. A variety of other IoT devices of Factories H, I, and J, and a Warehouse C are identified as data sources via the same data source identification process.

After the data source discovery and/or data source identification mechanism produces a list of potential data sources, the data extraction component may retrieve data from these potential data sources. For example, the data extraction component may retrieve temperature data from the temperature sensors. The temperature data may be associated with a timestamp indicating the temperature at a particular time of a day/week/month/year. The temperature data may also be associated with a location identifier indicating the temperature at a particular location of the facility. In another example, the data extraction component may retrieve installation speed data from the assembly line sensors. The installation speed data may indicate the speed that parts (e.g., car engines, brake components, wheels, etc.) are fed into the assembly lines. In some other cases, the installation speed data may indicate the speed that an installation is finished by the assembly line. The data extraction component may retrieve lighting data from the lighting system. The lighting data may be associated with a timestamp indicating whether the light is on at a particular time of a day/week/month/year and potentially the luminance. The lighting data may also be associated with a location identifier indicating where the lighting data is collected. In some other examples, the data extraction component may retrieve inventory data from an inventory sensor in the Warehouse C. The inventory data may indicate the amount of parts (e.g., engines, brake components, wheels, etc.) that are in stock in the Warehouse C. Additionally, the data extraction component may retrieve transportation data from a fleet of trucks that transport parts between Warehouse C and Factories B, H, I, and J. The transportation data may indicate the transportation capacity of the fleet of trucks, idling durations of the trucks, and the time durations required for delivery across different time of a day (i.e., rush hours vs. non-rush hours), different time of a week (i.e., weekdays vs. weekend), different time of a year (i.e., winter time with closed highways vs. summer time with no potential closures).

Once the data is extracted, the mapping mechanism may map data from the source format to an ontology by application of a first algorithm. In one example, the mapping component may look up an existing data storage to determine the make/model/firmware or unique fingerprint of the data source to determine the source data format and the corresponding mapped format in the ontology. For example, the fingerprint of a temperature sensor O indicates the data format is in Celsius and Swiss date format, thus the temperature data of sensor O is 27° C. at (dd.mm.yyyy). Another temperature sensor P's fingerprint indicates the data format is in Fahrenheit and U.S. date format, thus the temperature data of sensor P is 80.6° F. at (mm.dd.yyyy). The first algorithm obtains the fingerprints of both temperature sensors, and maps them in the ontology that has a data format of Celsius and National date format (i.e., YYYY-MM-DD). Because the first algorithm is able to understand the difference in data formats between temperature sensor O, temperature P, and the target ontology, it can map the two sets of data into the Celsius and National date format to provide better visibility and actionable insight. The mapping component may process the above mapping mechanism by an Extensible Stylesheet Language Transformations (XSLT) file, or simple field mapping (A→7). In another example, Domain Specific Language (DSL) may be utilized to provide mapping instructions that are executable by the mapping component. Once some initial mappings between the source data to the ontology are performed, these mappings may be used as training examples that are fed to a machine learning algorithm. A machine learning algorithm may automatically build device profiles associated with each discovered IoT devices (i.e., potential data sources) without human intervention, and train itself overtime when new sets of data comes in. The machine learning algorithm may map the subsequence stream of data coming from temperature sensors O and P into the ontology automatically because it has been trained to understand the difference between the source data format and the corresponding fields for the data. The machine learning algorithm can be a sub-algorithm of the first algorithm, wherein the first algorithm may perform the initial mappings, and then using the initial mappings to train this subset machine learning algorithm to perform the subsequent mappings.

A data merging/storage component may merge the mapped data into one or more databases. A simple relational database could be used by the data merging/storage mechanism. In another example, a combination of relational database and a time-series database may be used by the data merging mechanism. A time-series database may reflect the data changes of the mapped data overtime. Generally, a relational database enjoys the benefit of robust secondary index support, complex predicates, a rich query language, etc. However, when the data changes rapidly overtime, the volume of data can scale up enormously. Thus, it is preferable to have a separate time-series database works alongside the relational database. In another preferred example, the data merging/storage component utilizes a graph database to store the mapped data. A graph database is a database that uses graph structure for semantic queries with nodes (please note that "node" and "vertex" are used interchangeably in this application), edges, and properties to represent and store data. The data storage component of the present application provides a data structure wherein each vertex (node) in the graph also has a time-series store to capture data change overtime. The time-series store may be a standalone database, or it can be defined as a property of the vertex (node). For example, the temperature data extracted from temperature sensor O at 8pm on Jan. 27, 2021 may be stored in a graph database. The node in the graph may represent sensor O and the value is 27° C. The timestamp 8pm on Jan. 27, 2021 is stored as property for this node in the graph of the graph database. The time-series store may be associated with the nodes, and it may reflect the data changes overtime and provide a user with actionable insight. The relationship between different nodes are stored by edges. For example, the relationship between the temperature sensor O and a lighting sensor R may be defined by the edge between them. The edge may provide important information to a user, for example, when the lights are on (as shown by the lighting sensor R) near the temperature sensor O, the temperature may increase because the light bulbs produce heat. As we know the heat produced by light bulbs is considered as waste. A user provided by the information represented by the edge between the lighting sensor R and temperature sensor O may analyze the energy waste produced by a certain brand/type of light bulbs and make the decision on whether it is cost-efficient to replace these light bulbs. As describe above, because the mapped data is merged/stored with time-series store in a database, the resulting data contains a living representation of the data rather than a static view of the data. In the subsequent operations, the evolved and evolving vertices (nodes) in the graph may provide both provenance and history associated with them, and thus enable the data enrichment components to enrich the merged data, as described below.

The data enrichment component may apply a second algorithm to the merged data provided by the data merging/storage component to identify patterns and enrich the data based on the identified patterns. For example, the second algorithm may query the database (e.g., graph database) for the relationships (i.e., edges) between the brake inventory data (preferably inventory data overtime) of Warehouse C and the installation speed data for brake components of the assembly line of Factory B and Factory H. The query may show that the quantity of brake components in Warehouse C decreases by 5,000 during a two-day time period. During the same two-day period, Factory B installs 4,000 brakes and Factory H installs 3,000 brakes. This relationship data (e.g., represented by edges in the graph database) shows that it is possible that Factory B and Factory H may have another source of brake components other than the ones from Warehouse C. A further inquiry may identify the exact quantity of brake components transported from Warehouse C to Factory B every hour/day/week. In another example, the second algorithm may query the database (e.g., graph database) for the relationships (i.e., edges) between the power meter and the installation speed data for engines of the assembly line of Factory B. The relationship may indicate that 15,000 kWh are consumed for installing 4,000 engines. This pattern is recognized and identified as a pattern between the power meter data and the assembly line data. The data graph is thus enriched by adding this pattern as a relationship (represented as an edge) between the two nodes (e.g., one node represents the power meter data, and another node represent the assembly line data in terms of installing engines). This relationship provides a user (e.g., an operator of Factory B or the management team of Company A) an actionable insight to the operation of Factory B and may to determine whether improvements are necessary. The second algorithm may include a sub-algorithm which is a machine learning algorithm. The machine learning algorithm may be trained by some enriched data and the patterns within and between streams of data associated with one or more nodes. Once trained, the machine learning algorithm may identify patterns between different data stream (nodes) and the properties associated with the nodes. Preferably, the machine learning algorithm may train itself when the data integration pipeline is in idle or in low demand. The machine learning algorithm may identify patterns by query random nodes and discovery the underlying relationships between them. Once a pattern is identified, it may be added to the data nodes to enrich the data set.

The API component may provide the enriched data stream to a user. As described above, the enriched data provides the normalized, merged, and enriched data that provides actionable insight to a user. The enriched data provides an easier-to-understand data format than the raw data, and is embedded with pattern between different data sources. This enables a user to quickly develop applications utilizing the enriched data to optimize the operation of a factory, a number of factories and warehouses, and even financial models associated with the operations of factories. Note that although this Use Case takes an industrial environment as an example, the present subject matter may also be used in a number of different automation environments, such as a smart home, a medical or healthcare facility, a nursing home, an agricultural plant, and an energy management system.

While preferred embodiments of the present subject matter have been shown and described herein, it will be obvious to those skilled in the art that such embodiments are provided by way of example only. Numerous variations, changes, and substitutions will now occur to those skilled in the art without departing from the present subject matter. It should be understood that various alternatives to the embodiments of the present subject matter described herein may be employed in practicing the present subject matter.

What is claimed is:
1. A computer-implemented method comprising:
a) identifying a plurality of data sources associated with an automation environment;
b) retrieving data from at least one of the identified data sources, wherein the data is associated with a timestamp;
c) applying a first algorithm to map the retrieved data to a predetermined ontology, wherein the mapped data remains associated with the timestamp;
d) merging the mapped data into a data store comprising timeseries of the mapped data, wherein the data store comprises a graph database, wherein each vertex in the graph includes a timeseries store to capture data changes over time based on the timestamp associated with the mapped data, wherein merging the mapped data into the data store comprises matching mapped data with evolved vertices in the graph and merging new properties, shape details, or relationships into the matched vertices and timeseries data recorded in the vertex's timeseries store;
e) applying a second algorithm to identify patterns in the merged data and enriching the data based on one or more identified patterns, wherein the identified patterns are indicative of a relationship between one or more of the plurality data sources, wherein the relationship comprises a complete causal relationship, an incomplete causal relationship, or a correlational relationship, wherein enriching the data based on the one or more identified patterns comprises requesting creation or deletion of one or more vertices in the graph, one or more edges in the graph, one or more vertex properties in the graph, or one or more edge properties in the graph;
f) merging the enriched data into the data store to generate updated data and applying the second algorithm to further identify patterns in the updated data; and
g) providing one or more APIs or one or more real-time streams to provide access to the enriched data, the updated data, or both the enriched data and the updated data:
wherein the enriching the data is performed by a plurality of software agents, each configured to generate a specific enrichment, and wherein the enrichments are merged into the data store by origin tagging, wherein the origin tagging identifies the software agent that generated the enrichment.

2. The method of claim 1, wherein the automation environment comprises at least one networked industrial or commercial automation system.

3. The method of claim 1, wherein the plurality of data sources comprises at least one device, at least one programmable logic controller (PLC), at least one automation controller, at least one data file, at least one cloud service, or a combination thereof.

4. The method of claim 1, wherein the plurality of data sources comprises at least one device utilizing a first communications protocol and at least one device utilizing a second communications protocol, wherein the first communications protocol is different from the second communications protocol.

5. The method of claim 1, wherein the identifying the plurality of data sources is performed by passive discovery, active discovery, target interrogation, or a combination thereof.

6. The method of claim 5, wherein the passive discovery comprises observing traffic on a network.

7. The method of claim 6, wherein the passive discovery comprises identifying an origin or a destination for the traffic on the network.

8. The method of claim 5, wherein the active discovery comprises IP subnet scanning on a network, port scanning on a network, issuing protocol specific discovery commands on a network, or a combination thereof.

9. The method of claim 5, wherein the target interrogation comprises introspecting at least one PLC on a network.

10. The method of claim 1, wherein the retrieving data is performed on a schedule, performed in response to an event, as a result of passively observing communications among the data sources, or a combination thereof.

11. The method of claim 1, wherein the first algorithm comprises, a logic schema, a set of rules, a machine learning model, a statistical model, or a combination thereof.

12. The method of claim 1, wherein the merging the mapped data into the data store comprises matching mapped data with evolved vertices in the graph and merging new properties, shape details, or relationships into the matched vertices and timeseries data recorded in the vertex's timeseries store.

13. The method of claim 12, wherein the vertices, edges, properties, and underlying data is continuously updated to reflect the state of the extracted data.

14. The method of claim 12, wherein the applying the second algorithm to identify patterns in the merged data comprises identifying patterns in the graph, the timeseries, or both the graph and the timeseries.

15. The method of claim 1, wherein the second algorithm comprises a statistical analysis, a machine learning model, or a combination thereof.

16. The method of claim 1, wherein the steps are performed by a computer-based platform automatically and continuously.

17. A system comprising at least one computing device comprising at least one processor, a memory, and instructions executable by the at least one processor to create an application comprising:
   a) a data source discovery software module identifying a plurality of data sources associated with an automation environment;
   b) a data extraction software module retrieving data from at least one of the identified data sources, wherein the data is associated with a timestamp;
   c) a data mapping software module applying a first algorithm to map the retrieved data to a predetermined ontology, wherein the mapped data remains associated with the timestamp;
   d) a data storage software module storing timeseries of the mapped data in a data store;
   e) a data merging software module merging the mapped data into the data store, wherein the data store comprises a graph database, wherein each vertex in the graph includes a timeseries store to capture data changes over time based on timestamp associated with the mapped data, wherein the data merging software module is configured to merge the mapped data into the data store comprises matching mapped data with evolved vertices in the graph and merging new properties, shape details, or relationships into the matched vertices and timeseries data recorded in the vertex's timeseries store;
   f) a first data enrichment software module applying a second algorithm to identify patterns in the merged data and enrich the data based on one or more identified patterns, wherein the identified patterns are indicative of a relationship between one or more of the plurality data sources, wherein the relationship comprises a complete causal relationship, an incomplete causal relationship, or a correlational relationship, wherein enriching the data based on the one or more identified patterns comprises requesting creation or deletion of one or more vertices in the graph, one or more edges in the graph, one or more vertex properties in the graph, or one or more edge properties in the graph, wherein the enriching the data is performed by a plurality of software agents, each configured to generate a specific enrichment;
   g) a second data enrichment software module merging the enriched data into the data store to generate updated data and applying the second algorithm to further identify patterns in the updated data, wherein the enrichments are merged into the data store by origin tagging, wherein the origin tagging identifies the software agent that generated the enrichment; and
   h) a data access software module providing one or more APIs or one or more real-time streams comprising the enriched data, the updated data, or both the enriched data and the updated data.

18. A non-transitory computer-readable storage media encoded with instructions executable by one or more processors to provide an application comprising:
   a) a data source discovery module identifying a plurality of data sources associated with an automation environment;
   b) a data extraction module retrieving data from at least one of the identified data sources, wherein the data is associated with a timestamp;
   c) a data mapping module applying a first algorithm to map the retrieved data to a predetermined ontology, wherein the mapped data remains associated with the timestamp;
   d) a data storage module storing timeseries of the mapped data in a data store;
   e) a data merging module merging the mapped data into the data store, wherein the data store comprises a graph database, wherein each vertex in the graph includes a timeseries store to capture data changes over time based on the timestamp associated with the mapped data, wherein the data merging software module is configured to merge the mapped data into the data store comprises matching mapped data with evolved vertices in the graph and merging new properties, shape details, or relationships into the matched vertices and timeseries data recorded in the vertex's timeseries store;
   f) a first data enrichment module configured to apply a second algorithm to identify patterns in the merged data and enrich the data based on one or more identified patterns, wherein the identified patterns are indicative of a relationship between one or more of the plurality data sources, wherein the relationship comprises a complete causal relationship, an incomplete causal relationship, or a correlational relationship, wherein enriching the data based on the one or more identified patterns comprises requesting creation or deletion of one or more vertices in the graph, one or more edges in the graph, one or more vertex properties in the graph, or one or more edge properties in the graph, wherein the enriching the data is performed by a plurality of software agents, each configured to generate a specific enrichment;
   g) a second data enrichment module configured to merge the enriched data into the data store to generate updated data and apply the second algorithm to further identify patterns in the updated data, wherein the enrichments are merged into the data store by origin tagging, wherein the origin tagging identifies the software agent that generated the enrichment; and
   h) a data access module providing one or more APIs or one or more real-time streams comprising the enriched data, the updated data, or both the enriched data and the updated data.

* * * * *